Feb. 17, 1948.  J. F. EGAN  2,436,103
PHOTOGRAPHIC RECORDING EQUIPMENT
Filed Feb. 9, 1946
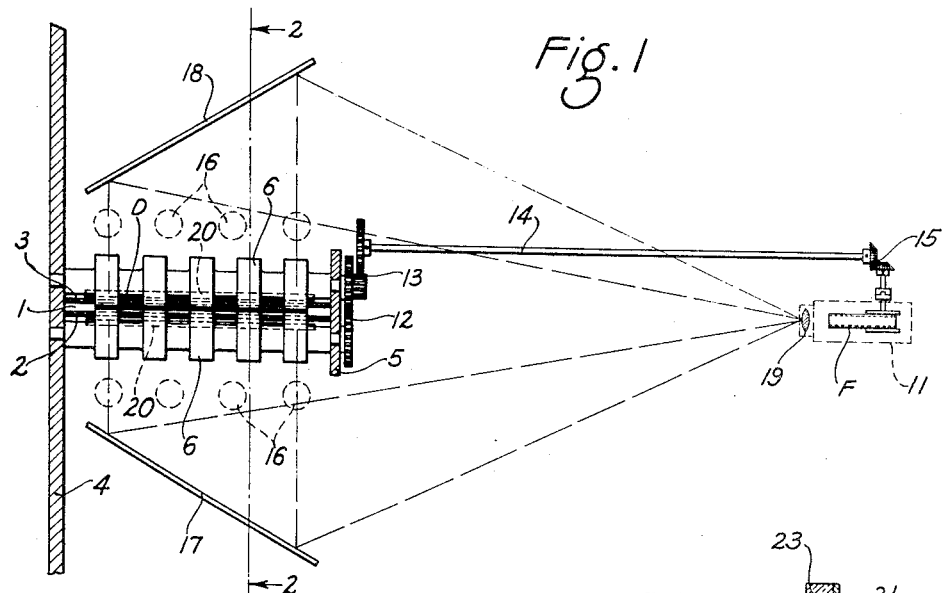
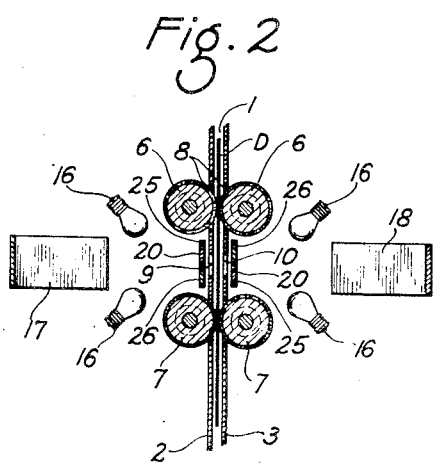
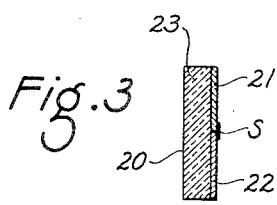
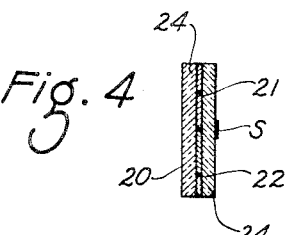
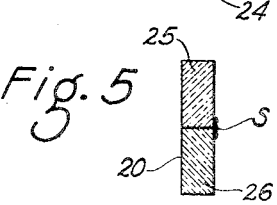
John F. Egan
INVENTOR
BY
ATTORNEYS Patented Feb. 17, 1948

2,436,103

UNITED STATES PATENT OFFICE 2,436,103

PHOTOGRAPHIC RECORDING EQUIPMENT

John F. Egan, Rochester, N. Y., assignor to Eastman Kodak Company, Rochester, N. Y., a corporation of New Jersey Application February 9, 1946, Serial No. 646,534

6 Claims. (Cl. 88—24)

The present invention relates to photographic recording equipment and more particularly to an improvement in photographic recording equipment in which both sides of a continuously moving document are photographed simultaneously.

As is well known, in continuous photographic copying machines, the document is moved through a feedway and past an exposure aperture which is in the field of a camera and illuminated on both sides as it passes the exposure aperture. The reflected image of each side of the document is directed by mirrors to the camera lens so that the images appear on the film in the camera in side by side relationship either in abutment or slightly spaced apart. With certain types of documents, particularly those which contain printed or written matter on both sides of relatively thin or translucent paper, "ghost" or "X-ray" images appear on the film which are caused by the light transmitted through the document. Various methods have been suggested for eliminating these transmitted images, one of which is the use of complementary colored filters.

When complementary colored filters are used, a filter is placed adjacent each exposure aperture for illuminating the two sides of the document with complementary colored light, or complementary colored lamps may be used on each side of the exposure aperture. Complementary colored filters are also placed between the mirrors and the camera lens so that the images which are transmitted through the document are eliminated and only the reflected images of the two faces of the document find their way to the camera lens. Although this arrangement eliminates the transmitted image, the density of the images on the film will not necessarily be the same.

Another factor that enters into the unequal density of the images is the color of the document being photographed. The image of a pinkish or salmon colored document will have a density of 1.0 when illuminated with a red filter or lamp, however, the opposite side which is illuminated with the blue lamp or filter has a density of only 0.5. In a similar manner, the image of a bluish document which is illuminated with a red lamp or filter has a density of between 0.7 and 0.8, whereas the side illuminated with the blue lamp or filter has a density of between 1.0 and 1.1. A similar range of differences in densities will hold true for filters or lamps of other complementary colors.

The primary object of the present invention is to provide a single filter means adjacent each exposure aperture in a document copying machine for eliminating the image formed by the light transmitted through the document.

Another object of the invention is to provide a single filter adjacent each exposure aperture in a document copying machine for eliminating the image formed by the light transmitted through the document and which will provide images on the film of equal density.

A further object of the invention is to provide a filter means comprising two elements of complementary colors adjacent each exposure aperture and arranged in inverse relationship for eliminating the image transmitted through the document and for providing images of equal density.

These and other objects of the invention will appear from the following specification, the novel features being pointed out in the claims at the end thereof.

The aforementioned and other objects of the invention are embodied in a photographic copying machine which includes a feedway comprising two spaced-apart walls in which there are apertures which are in registry and in the field of a camera, a feeding means for continuously moving the document between the walls of the feed-way and past the exposure apertures, means for illuminating both sides of the document as it passes the exposure apertures, mirrors for reflecting the images of both sides of the document to the camera lens as well as the transmitted images of both sides, an advancing means for the film which is connected to the feeding means for the document so that both means operate in synchronism, and filters comprising two elements of complementary color adjacent each exposure aperture and arranged in inverse relationship for eliminating the transmitted image from each reflected beam.

Coming now to the drawings wherein like reference characters denote like parts:

Fig. 1 is a diagrammatic plan view of a document copying machine embodying my invention;

Fig. 2 is a diagrammatic sectional view taken on the line 2—2 of Fig. 1;

Figs. 3, 4, and 5 are sections through a filter showing various ways of constructing a filter comprising complementary elements.

In the embodiment of my invention, the feedway 1 is formed by the walls 2 and 3 which are mounted between the outer casing wall 4, only one of which is shown, and an intermediate wall 5. The feed rolls 6 and 7 for advancing the document D are arranged in pairs and mounted between the walls 4 and 5, as shown in Fig. 1. The rolls 6 and 7 may be driven in any conventional manner, such as by means of a belt drive connected to a motor or by means of a geared drive between the rolls and a motor. The walls 2 and 3 are provided with apertures 8 to permit the rolls 6 and 7 to extend therethrough for contacting and moving the document D and with transverse apertures 9 and 10 in the walls 2 and 3, respectively, which are in registry and in the field of the camera 11. The apertures 9 and 10 provide the station at which the document is photographed as it is moved past the apertures by the rolls 6 and 7.

The feed rolls 6 are geared together, as shown at 12 in Fig. 1, as are the feed rolls 7. The rolls 6 are provided with a take-off gear train 13 which is connected to the camera film drive by means of the shaft 14 and the bevel gears 15. The drives are so geared that the film F in the camera 11 is advanced continuously with the document D and in proper synchronism.

The lamps 16 provide for illumination of the document as it passes the exposure apertures 9 and 10 and may be arranged in banks on either side of the feed rolls 6 and 7, as indicated by the dotted lines in Fig. 1.

The mirrors 17 and 18 are placed obliquely in a plane containing the apertures 9 and 10 to direct the images of both sides of the document D to the camera lens 19. It can be readily appreciated at this point, that if the document is made of a relatively thin and translucent paper or similar material, the mirror 17 will not only receive the reflected image of the left side of the document D, see Fig. 2, but also the image of the right side which will be transmitted through the document D. In a like manner, the mirror 18 will also receive both a reflected and a transmitted image. As pointed out above, with the use of filters of complementary color as previously disclosed, the transmitted images are eliminated, but the density of the reflected images will vary, which results in unequal exposure of the film. The arrangement of complementary filters about to be described not only eliminates the transmitted images but also provides for even density of the images and, hence, equal exposure.

The filter means 20 is composed of two complementary filters which may be constructed as shown in Figs. 3, 4, and 5. In Fig. 3, the filters 21 and 22 may either be of gelatin or glass which are cemented to a glass plate 23 or, as shown in Fig. 4, may be cemented between the glass plates 24. In Fig. 5, the filter means 20 is made up of glass filters 25 and 26 which are fused together. A narrow opaque strip S may be cemented over the junction of the two filters in order to obtain a sharp and even dividing line between the two elements. The filter colors are chosen so that one will stop about 80–90 percent of the light transmitted by the other and, of course, vice versa. The two colors used should be complementary to each other and should transmit light relatively well in that portion of the sensitivity range of the film in which the other transmits very little. For instance, if the filter 21 or 25 is red, it will transmit well at the red end of the spectrum and very little in the blue, whereas, if the filter 22 or 26 is blue, it will transmit well at the blue end and very little in the red. However, the filters are chosen so that about one half of the total exposure with white paper is received through each filter.

The filter means 20, when in one of the forms shown in Figs. 3, 4, and 5, are placed adjacent the exposure apertures 9 and 10, as shown in Fig. 2. However, in mounting the filters in place, the colors must be in inverse order, that is, if a red and blue filter is used and the red filter is placed uppermost on the left side of the exposure aperture 9, the blue filter, or the complement of the left side, must be placed uppermost on the right side of the exposure aperture 10. With this arrangement two results are obtained; namely, the document as it passes the exposure aperture 9 and 10 is illuminated by complementary colored light on each side and the light transmitted through the document is eliminated by the filter on the opposite side; secondly, if colored documents are being photographed, the images will have the same intensity and, hence, the film will receive the same exposure from both images because both sides are photographed through the same colored filters but in opposite order.

In the embodiment of my invention, I have shown it applied to a photographic copying machine in which the document and film are moved continuously; however, those skilled in the art will realize that it is also applicable when the document and film are stationary during photographing.

I claim:

1. In photographic recording apparatus for simultaneously photographing both sides of a document, the combination with a camera, a document station, means for simultaneously illuminating both sides of the document when at said station, and a reflecting means on each side of said station for directing the images of the obverse and reverse sides of the document into said camera and also incidentally directing thereinto undesirable images transmitted through the document, of light filter means adjacent to and on each side of said station, each of said filter means comprising two elements of complementary colors and arranged in inverse relationship to each other for eliminating the images formed by the light transmitted through the document.

2. In photographic recording apparatus for simultaneously photographing both sides of a document, the combination with a camera, a document station, means for simultaneously illuminating both sides of the document when at said station, and a reflecting means on each side of said station for directing the images of the obverse and inverse sides of the document into said camera and also incidentally directing thereinto undesirable images transmitted through the document, of complementary light filter means adjacent to and on each side of said station, said filter means having one portion for transmitting light to illuminate the document and a second portion complementary in color to said first portion for eliminating the light transmitted through the document from the opposite side and arranged in inverse relationship to each other.

3. In photographic recording apparatus for simultaneously photographing both sides of a document, the combination with a camera, a feedway providing two transverse exposure apertures, said apertures being spaced apart and in registry in the field of said camera, an advancing means for moving the photo-sensitive material in said camera in accordance with the movement of the document past said apertures, means for illuminating both sides of the document as it passes said apertures, and a reflecting means on each side of said station for directing the images of the obverse and reverse sides of the document onto the sensitized material in said camera and also incidentally directing thereonto undesirable images transmitted through the document, of light filter means adjacent to each exposure aperture, each of said filter means comprising two elements of complementary colors and arranged in inverse relationship to each other for eliminating the images formed by the light transmitted through the document.

4. In photographic recording apparatus for simultaneously photographing both sides of a document, the combination with a camera, a feedway providing two transverse exposure apertures, said apertures being spaced apart and in registry in the field of said camera, an advancing means for moving the photo-sensitive material in said camera in accordance with the movement of the document past said apertures, means for illuminating both sides of the document as it passes said apparatus, and a reflecting means on each side of said station for directing the images of the obverse and reverse sides of the document onto the sensitized material in said camera and also incidentally directing thereonto undesirable images transmitted through the document, of complementary light filter means adjacent to each exposure aperture and in the path of the reflected image, said filter means having one portion for transmitting light to illuminate the document and a second portion complementary in color to said first portion for eliminating the light transmitted through the document from the opposite side and arranged in inverse relationship to each other.

5. In photographic recording apparatus for simultaneously photographing both sides of a document, the combination with a feedway providing two transverse exposure apertures, said apertures being spaced apart and in registry, a feeding means for continuously moving the document past said exposure apertures, means for illuminating both sides of the document as it passes said apertures, an advancing means for moving a photo-sensitive material and adapted to operate in synchronism with the movement of the document, and a reflecting means on each side of said station for directing the images of the obverse and reverse sides of the document onto the photo-sensitive material in spaced-apart relationship and also incidentally directing thereonto undesirable images transmitted through the document, of light filter means adjacent to each exposure aperture and in the path of the reflected image, each of said filter means comprising two elements of complementary colors and arranged in inverse relationship to each other for eliminating the images formed by the light transmitted through said document.

6. In photographic recording apparatus for simultaneously photographing both sides of a document, the combination with a feedway providing two transverse exposure apertures, said apertures being spaced apart and in registry, a feeding means for continuously moving the document past said exposure apertures, means for illuminating both sides of the document as it passes said apertures, an advancing means for moving a photo-sensitive material and adapted to operate in synchronism with the movement of the document, and a reflecting means on each side of said station for directing the images of the obverse and reverse sides of the document onto said photo-sensitive material in spaced-apart relationship and also incidentally directing thereto undesirable images transmitted through the document, of complementary light filter means adjacent to each exposure aperture and in the path of the reflected image, said filter means having one portion for transmitting light to illuminate the document and a second portion complementary in color to said first portion for eliminating the light transmitted through the document from the opposite side and arranged in inverse relationship to each other.

JOHN F. EGAN.

REFERENCES CITED

The following references are of record in the file of this patent:

UNITED STATES PATENTS

| Number | Name | Date |
|---|---|---|
| 1,391,807 | Swaim et al. | Sept. 27, 1921 |